United States Patent
Yin et al.

(10) Patent No.: US 9,857,883 B2
(45) Date of Patent: Jan. 2, 2018

(54) WIRELESS TAILED MOUSE

(71) Applicant: Shenzhen Zhuiguang Electronic Technology Co., Ltd, Shenzhen (CN)

(72) Inventors: Zhengkai Yin, Shenzhen (CN); Shicong Xie, Shenzhen (CN)

( * ) Notice: Subject to any disclaimer, the term of this patent is extended or adjusted under 35 U.S.C. 154(b) by 0 days.

(21) Appl. No.: 15/173,721

(22) Filed: Jun. 6, 2016

(65) Prior Publication Data

US 2017/0131791 A1    May 11, 2017

(30) Foreign Application Priority Data

Nov. 11, 2015 (CN) .......................... 2015 1 0767074

(51) Int. Cl.
| | |
|---|---|
| *G06F 3/03* | (2006.01) |
| *G06F 3/038* | (2013.01) |
| *G06F 3/0354* | (2013.01) |
| *F21V 8/00* | (2006.01) |
| *F21V 23/00* | (2015.01) |
| *F21S 9/02* | (2006.01) |
| *H05B 33/08* | (2006.01) |

(52) U.S. Cl.
CPC .............. *G06F 3/0317* (2013.01); *F21S 9/02* (2013.01); *F21V 23/005* (2013.01); *G02B 6/0096* (2013.01); *G06F 3/038* (2013.01); *G06F 3/03543* (2013.01); *H05B 33/0845* (2013.01)

(58) Field of Classification Search
CPC . G06F 3/0354; G06F 3/03541; G06F 3/03543
See application file for complete search history.

(56) References Cited

U.S. PATENT DOCUMENTS

| | | | | |
|---|---|---|---|---|
| 5,692,956 A | * | 12/1997 | Rifkin ..................... | A63F 13/06 345/163 |
| 7,800,584 B2 | * | 9/2010 | Chang ................. | G06F 3/03543 345/156 |
| 8,013,840 B1 | * | 9/2011 | McDonough ....... | G06F 3/03543 345/163 |
| 2005/0117130 A1 | * | 6/2005 | Bohn ...................... | G06F 3/033 353/119 |
| 2006/0133093 A1 | * | 6/2006 | Chen ................... | G06F 3/03543 362/340 |

(Continued)

*Primary Examiner* — Lixi C Simpson
(74) *Attorney, Agent, or Firm* — Wayne & Ken, LLC; Tony Hom (57) ABSTRACT

The present invention discloses a wireless tailed mouse which comprises a mouse housing, a master circuit board arranged in the mouse housing, a visual signal current mouse tail externally connected to the mouse housing, and a wireless signal receiver inserted into a computer. The visual signal current mouse tail comprises at least one light emitting element. The master circuit board comprises a master control circuit microprocessor, and a control circuit board of the light emitting element, a wireless signal transmitting modular component, a mouse displacement detector, a mouse button switch and an encoder which are connected with the master control circuit microprocessor. The present invention has the visual signal current mouse tail which has the function of emitting light and the display function of displaying a current flow state of signal transmission, has diverse changes and has a strong fashionable and dynamic effect.

9 Claims, 7 Drawing Sheets

(56) References Cited

U.S. PATENT DOCUMENTS

2007/0132733 A1* 6/2007 Ram .................. G06F 3/0227
345/163
2012/0064973 A1* 3/2012 Bechtel ................ G06F 3/016
463/37

* cited by examiner

WIRELESS TAILED MOUSE

CROSS-REFERENCE TO RELATED APPLICATIONS

This application claims priority to Chinese Patent Application No. 201510767074.2 with a filing date of Nov. 11, 2015. The content of the aforementioned application, including any intervening amendments thereto, is incorporated herein by reference.

TECHNICAL FIELD

The present invention relates to an electronic signal material product, and particularly to a computer fitting product.

BACKGROUND

An existing computer fitting product mouse includes two categories: wired mice and wireless mice. The wireless mice are arranged to be bald tailless mice, and transmission and emission states of a wireless signal are invisible. The category of mice has a rigid appearance and has difficulty in catering to fashionable and dynamic needs pursued by a younger generation.

SUMMARY

The present invention aims to overcome the above defect in the prior art and to provide a mouse having beautiful appearance and reliable performance and being capable of displaying an action instruction of the mouse in an analog mode in a mouse tail similar to a transmitting antenna by using flow rate change of light emitting or streamy light emitting signal current so that the mouse tail presents a different transmission state of simulating visual signal current when the mouse is operated, thereby increasing dynamics for monotonous mouse operation and also enhancing a transmitting signal of the wireless mouse.

To achieve the above purpose, the present invention adopts the following technical solution: a wireless tailed mouse comprises a mouse housing, a master circuit board arranged in the mouse housing, a visual signal current mouse tail externally connected to the mouse housing, and a wireless signal receiver inserted into a computer. The visual signal current mouse tail comprises at least one light emitting element; the master circuit board comprises a master control circuit microprocessor, a control circuit board of the light emitting element, a wireless signal transmitting modular component, a mouse displacement detector, a mouse button switch and an encoder; the mouse displacement detector, the mouse button switch and the encoder are respectively connected with the master control circuit microprocessor; the master control circuit microprocessor is connected with the at least one light emitting element through the control circuit board of the light emitting element; and the master control circuit microprocessor is connected with the wireless signal receiver through the wireless signal transmitting modular component.

Compared with the prior art, the present invention has a visual signal current mouse tail. The control circuit board of the light emitting element controls the light emitting element to operate in a set program according to a pulse signal instruction of the master control circuit microprocessor. The set program is used for distinguishing mouse buttons including a left button, a right button, a middle button and a bypass button, forward and backward toggle of an encoder toggle roller, and different pulse signal instructions of the mouse displacement detector so as to control the change of point-by-point progressive light emitting and flashing light emitting frequency of the light emitting element in the mouse tail for displaying different emission states of the mouse signal in an analog mode. The visual signal current mouse tail has diverse light emitting functions and the function of displaying different emission states in an analog mode when the wireless signal of the wireless mouse is emitted, and has a strong fashionable and dynamic effect.

As a preferred technical solution, the light emitting element comprises at least one point-by-point progressive EL ray; and the control circuit board of the light emitting element is a multipath AC driving circuit board for point-by-point progressive EL rays. A central electrode conducting wire of point-by-point progressive light emitting EL rays is formed by combining multi-core insulated and twisted conducting wires. Like a structure of an ordinary EL ray, on the outer wall of a central electrode, a light emitting powder layer is coated; a light-transparent conducting layer is coated on the outer wall of the light emitting powder layer; a naked conducting wire of an auxiliary electrode is twined in parallel or spirally on the external wall of the light-transparent conducting layer; a common electrode of the multipath AC output driving circuit board is connected with the naked conducting wire of the auxiliary electrode; and remaining electrodes of the multipath AC output driving circuit board are connected with the central electrode. When the EL ray only needs to change light emitting brightness and flashing light emitting frequency, remaining output electrodes can be connected in parallel; a plurality of multi-core conducting wires of the central electrode are connected together in parallel; and at this moment, the entire body of the EL ray emits light like the ordinary EL ray. The light emitting brightness and flashing frequency are changed according to the change of output current, voltage and frequency of the multipath AC output driving circuit board. When the point-by-point progressive multipath AC driving circuit board successively turns on or off multi-core electrodes in the central electrode of the EL ray in accordance with a certain frequency according to microprocessor instructions, a light emitting segment point of the whole EL ray flows. A point-by-point progressive light emitting frequency is 30-300 milliseconds, and the flow rate is executed according to corresponding programs of different button pulse signals. The EL ray can simulate different emission states of signal current when different button signals of the wireless mouse are transmitted.

As another preferred technical solution, the light emitting element is an LED travelling lantern; and the control circuit board of the light emitting element is a DC control circuit board of the LED travelling lantern. When the light emitting element is an LED travelling lantern, a plurality of groups of LED travelling lanterns are arranged; and each group of LED travelling lanterns comprises at least three LED lamps. When the DC control circuit board of the LED lamp successively drives three LED lamps to emit light in accordance with a certain frequency according to microprocessor instructions, the plurality of groups of LED lamps can be changed in different flow rates and a point-by-point progressive light emitting frequency is 30-300 milliseconds for realizing different emission states in an analog mode when diverse current emission of the wireless mouse signals is performed.

As still another preferred technical solution, the light emitting element is an LED focusing projection lamp; and the control circuit board of the light emitting element is a control circuit board of the focusing projection lamp. When the light emitting element is a single focusing projection lamp and the control circuit board of the focusing projection lamp controls the change of light emitting and flashing frequency, colors and brightness of the focusing projection lamp according to microprocessor instructions, different emission states of signal current of the wireless mouse in different button operation states can be displayed in an analog mode.

As another preferred technical solution, when the light emitting element includes at least three single-core EL rays, the three EL rays are light emitting cables in a spiral twisting shape and are arranged in the mouse tail; the control circuit board of the light emitting element is a multipath AC control circuit board of the EL rays; when the multipath AC control circuit board of the EL rays controls the plurality of EL rays to successively emit light alternately according to microprocessor instructions, the change of the flow rates of the signal current of the wireless mouse as well as different emission states in different button operation states can also be displayed in an analog mode.

Further, the visual signal current mouse tail comprises a light-transparent plastic coating layer. The light-transparent plastic coating layer is made of light-transparent plastics or light guiding plastics and is coated outside the light emitting element and the transmitting antenna. The light-transparent plastic layer or light guiding plastic layer presents plastic flexibility and can be folded and processed towards the front upper part into arc-shaped, semicircular and wavy transmitting antenna shapes. The mouse tail extends from the mouse housing to the front upper part, and the area of the radial section thereof is gradually decreased.

Specifically, the master circuit board also comprises a lithium battery charging/discharging circuit board and a Micro USB mother base; and the Micro USB mother base is embedded to the mouse housing and is connected with other electrical components of the master circuit board through the lithium battery charging/discharging circuit board for supplying power for various electrical components on the master circuit board. External connection charging is realized through the combination of the lithium battery charging/discharging circuit board and the Micro USB mother base.

Further, a control IC chip is arranged in the control circuit board of the light emitting element. The control IC chip receives pulse signals of the encoder, different button switches of the mouse and the mouse displacement detector through the master control circuit microprocessor for controlling the change of turn-on or turn-off frequency and brightness of the light emitting element for realizing different emission states in an analog mode when diverse current emission of the wireless mouse signals is performed.

To understand the present invention more clearly, concrete embodiments of the present invention are elaborated below in combination with the description of the drawings.

In the drawings:
10—mouse housing;
20—mouse button;
30—encoder toggle roller;
40—master circuit board;
501—first visual signal current mouse tail;
502—second visual signal current mouse tail;
503—third visual signal current mouse tail;
60—mouse displacement detector;
22—mouse button switch;
33—encoder;
41—master control circuit microprocessor;
43—point-by-point progressive multipath AC driving circuit board;
432—control IC chip of EL ray;
435—AC output terminal of a common auxiliary electrode;
437—a first AC output terminal of a central electrode;
438—a second AC output terminal of the central electrode;
439—a third AC output terminal of the central electrode;
44—DC control circuit board of an LED travelling lantern;
444—a second DC positive output terminal;
446—a second DC negative input terminal;
447—control IC chip of an LED lamp;
46—control circuit of a focusing projection lamp;
462—control IC chip of the focusing projection lamp;
464—third DC positive output terminal;
465—third DC negative input terminal;
45—lithium battery charging/discharging circuit board;
47—Micro USB mother base;
49—wireless mouse transmitting modular component;
491—wireless signal receiver;
50—transmitting antenna;
52—light-transparent nonconducting coating layer;
54—EL ray;
541—light-transparent wrapping layer;
542—insulated dielectric layer;
543—light emitting powder layer;
544—light-transparent conducting layer;
545—auxiliary electrode wire;
546—inner light-transparent nonconducting coating layer;
547—first central electrode conducting wire;
548—second central electrode conducting wire;
549—third central electrode conducting wire;
581—first LED lamp;
582—second LED lamp;
583—third LED lamp;
59—focusing projection lamp;
592—light guiding column.

DETAILED DESCRIPTION

A dynamic display function of signal current in the tailed wireless mouse of the present invention is realized mainly by means of successive section-by-section light emitting cables of EL rays in the visual signal current mouse tail or the travelling lanterns of LED lamp cables or LED focusing projection lamps or a single EL ray. Descriptions are made below in four embodiments.

Embodiment 1

Figure 1:
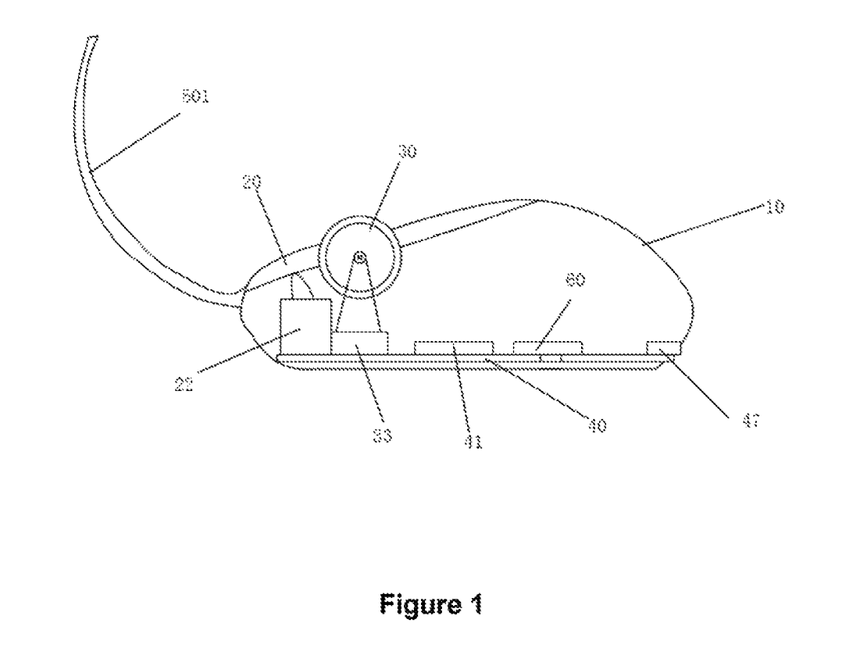
FIG. 1 is a structural diagram of the present invention.
Figure 2:
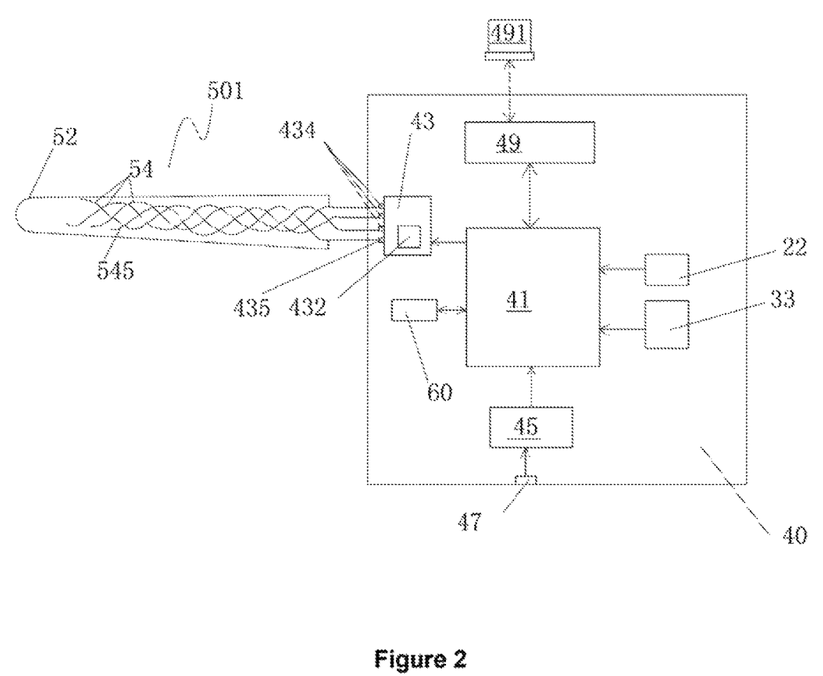
FIG. 2 is a structural schematic diagram of embodiment 1.
Figure 5:
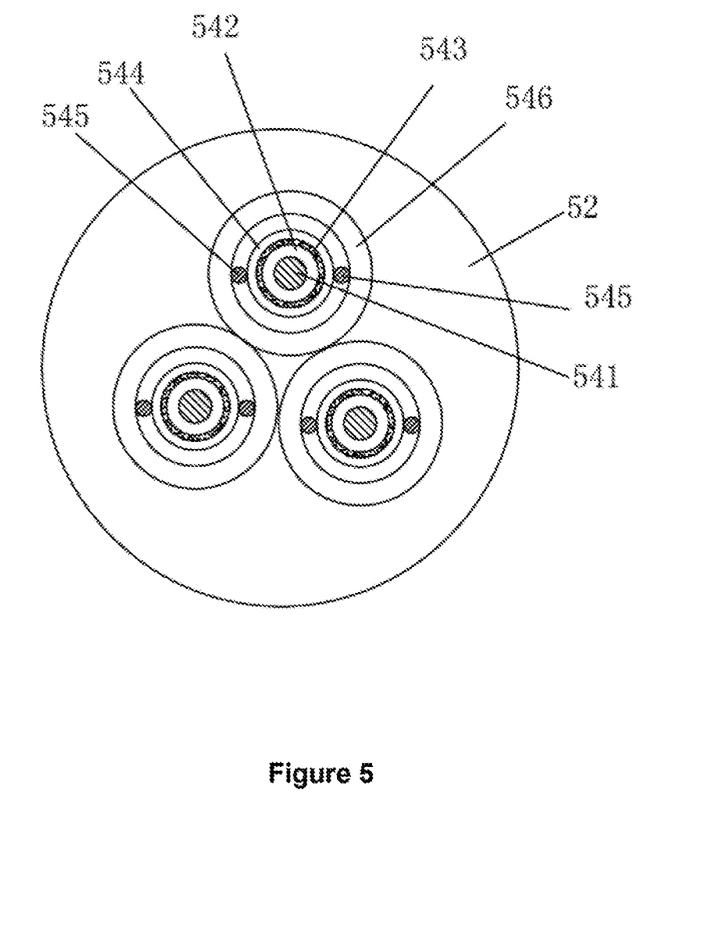
FIG. 5 is a first radial section view of a visual signal current mouse tail.

With reference to FIG. 1, FIG. 2 and FIG. 5, the tailed wireless mouse in embodiment 1 comprises a mouse housing 10, a mouse button 20, an encoder toggle roller 30, a master circuit board 40 and a first visual signal current mouse tail 501, wherein the mouse button 20 and the encoder toggle roller 30 are respectively movably embedded on the mouse housing 10; the first visual signal current mouse tail 501 is externally connected to the mouse housing 10; the master circuit board 40 is arranged in the mouse housing 10; and the mouse displacement detector 60 is arranged in the master circuit board 40. Moreover, the first visual signal current mouse tail 501, the mouse button switch 22 and the encoder 33 are electrically connected with the master circuit board 40 respectively.

Figure 7:
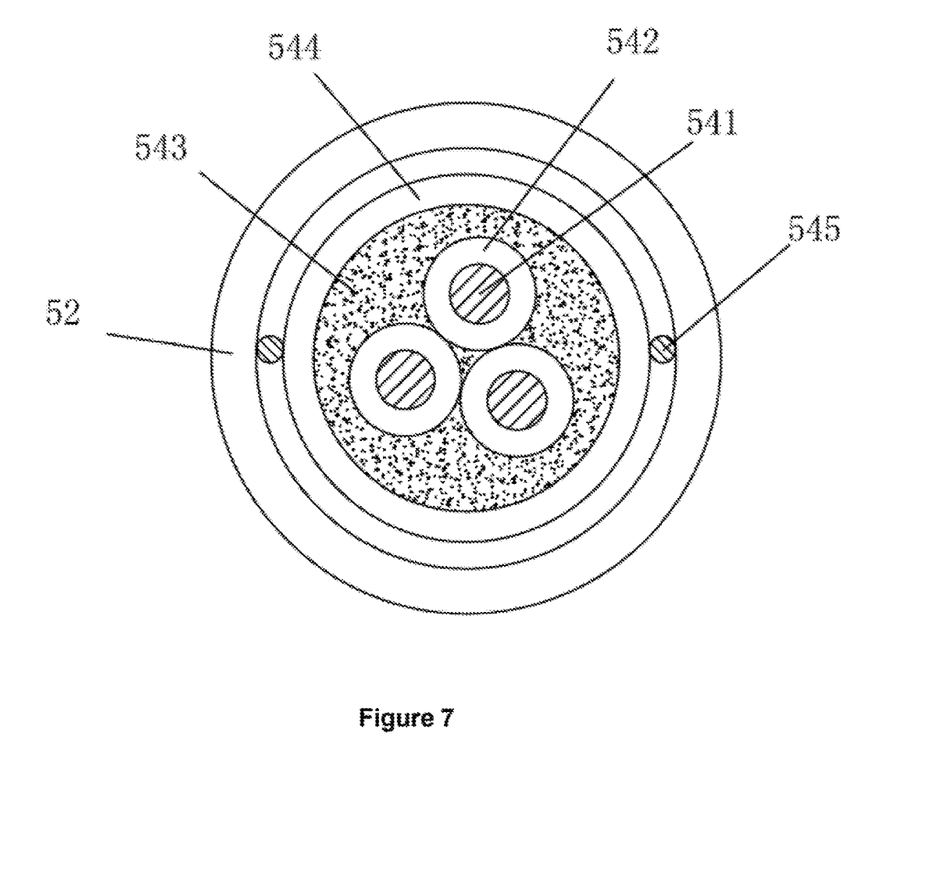
FIG. 7 is a third radial section view of a visual signal current mouse tail.

Specifically, the first visual signal current mouse tail 501 comprises a light-transparent nonconducting coating layer 52 and an EL ray 54; and a light-transparent coating layer 541 is wrapped on the outer wall of the EL ray. The central electrode of the EL ray is formed by twisting insulated conducting wires with at least three cores, i.e., the first central electrode conducting wire 547, the second central electrode conducting wire 548 and the third central electrode conducting wire 549 are twisted to form the central electrode of point-by-point progressive light emitting EL ray. As shown in FIG. 7, on the outer wall of the central electrode, the light emitting powder layer 543 and the light-transparent conducting layer 544 are successively coated; a plurality of auxiliary electrode wires 545 are respectively twisted on the light-transparent conducting layer 544 and are in close contact with the light-transparent conducting layer 544; and the light-transparent wrapping layer 541 is wrapped on the outermost layer.

The master circuit board 40 comprises a master control circuit microprocessor 41, a point-by-point progressive multipath AD driving circuit board 43, a wireless mouse transmitting modular component 49, a lithium battery charging/discharging circuit board 45, a Micro USB mother base 47, a mouse button switch 22, an encoder 33 and a mouse displacement detector 60, wherein the mouse button 20 is connected with the mouse button switch 22; the encoder toggle roller 30 is connected with the encoder 33; and a control IC chip 432 of the EL ray is arranged in the point-by-point progressive multipath AC driving circuit board 43.

wherein the master control circuit microprocessor 41 is connected with the mouse button switch 22, the encoder 33, the mouse displacement detector 60, the point-by-point progressive multipath AD driving circuit board 43, the wireless mouse transmitting modular component 49 and the lithium battery charging/discharging circuit board 45; the point-by-point progressive multipath AD driving circuit board 43 is connected with the EL ray which forms the light emitting element of the mouse tail 501 of the wireless mouse; and the Micro USB mother base 47 is embedded to the mouse housing 10 and is connected with various electrical components on the master circuit board 40 through the lithium battery charging/discharging circuit board 45 for supplying power for the electrical components.

In addition, the present invention also comprises a wireless signal receiver 491 inserted into a computer. A signal of the wireless signal receiver 491 is connected with the wireless mouse transmitting modular component 49. To enhance a transmitting signal, a transmitting antenna 50 of a metal conducting wire can be added in the mouse tail.

The master circuit board 40 controls the EL ray of the first visual signal current mouse tail 501 to emit light by receiving pulse signal instructions emitted by the mouse button switch 22, the encoder 33 and the mouse displacement detector 60. That is, the mouse button switch 22, the encoder 33 and the mouse displacement detector 60 are respectively connected with the master control circuit microprocessor 41 of the master circuit board 40. The master control circuit microprocessor 41 receives different pulse signal instructions emitted by the mouse button switch 22, the encoder 33 and the mouse displacement detector 60 for controlling the wireless mouse transmitting modular component 49 on the master circuit board 40 to emit wireless signal instructions to the wireless signal receiver 491 to operate and control the computer to work. Meanwhile, the master control circuit micro processor 41 also drives the EL ray in the mouse tail 501 of the wireless mouse to progressively flow and emit light point by point in accordance with a set program according to the multipath AC driving circuit board 43 of different pulse signal instructions.

The set program can enable different buttons of the mouse button switch 22, different forward and backward toggles of the encoder 33 and different movement positions monitored by the mouse displacement detector 60 to start the multipath AC driving circuit board 43 so as to accordingly drive the EL ray to emit light and change the flow rates at different turn-on or turn-off frequencies. A point-by-point progressive light emitting frequency is 30-300 milliseconds so as to control the mouse tail 501 of the wireless mouse to display different emission states.

Specifically, the multipath AC driving circuit board 43 is provided with AC output terminals 437, 438 and 439 of the central electrode and an AC output terminal 435 of the common auxiliary electrode, wherein the AC output terminals 437, 438 and 439 of the central electrode are respectively in one-to-one corresponding connection with the central electrode conducting wires 547, 548 and 549 of the ray 54. The AC output terminal 435 of the common auxiliary electrode is connected with the auxiliary electrode wires 545 on the outer wall of the light-transparent conducting layer 544 of the above ray 54. The AC output terminal 435 of the common auxiliary electrode is often conducted for power supply. When the AC output terminals 437, 438 and 439 are successively turned on and conducted or turned off and de-energized alternately in accordance with a certain frequency period, the central electrode conducting wires 547, 548 and 549 of the ray 54 and the auxiliary electrode wires 545 of the ray 54 successively form an AC electric field for driving the ray 54 in the electric field to emit light progressively point by point. Because three central electrodes 547, 548 and 549 of the ray 54 are spirally twisted, the light emitting segment points progressively flow and emit light point by point, which can only be seen by human eyes from a front surface so as to display the emission state that the wireless analog mouse signal flows and emits light in an analog mode in accordance with different current frequencies.

Embodiment 2

Figure 3:
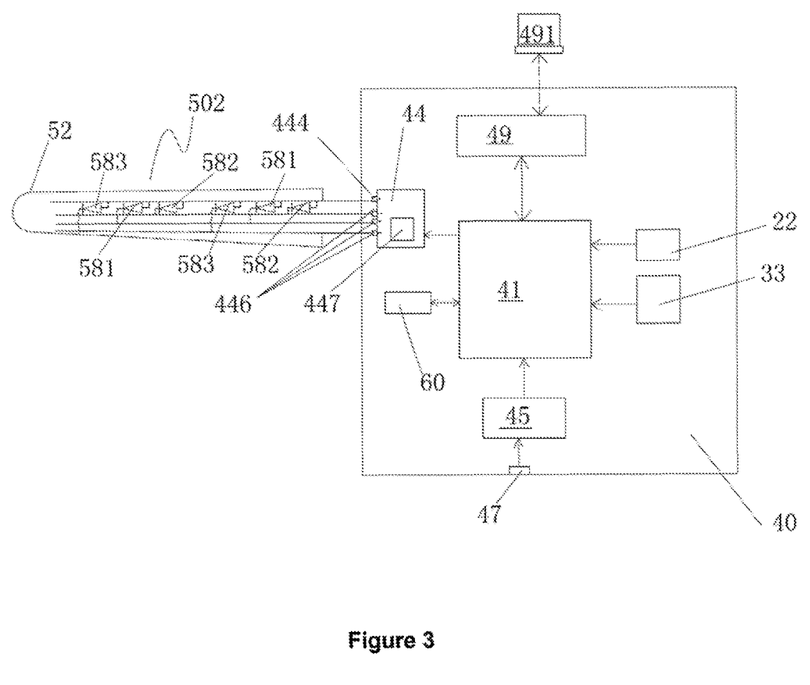
FIG. 3 is a structural schematic diagram of embodiment 2.

With reference to FIG. 1 and FIG. 3, the technical solution of embodiment 2 and the technical solution of embodiment 1 are almost the same and have the difference that: the second visual signal current mouse tail 502 of embodiment 2 replaces the first visual signal current mouse tail 501 of embodiment 1. In the master circuit board 40, the DC control circuit board 44 of the LED travelling lantern is adopted for replacing the AC driving circuit board 43 which emits light successively section by section in embodiment 1.

The structure of the second visual signal current mouse tail 502 of embodiment 2 is different from that of the first visual signal current mouse tail 501 of embodiment 1 in that the LED travel ing lantern cable in embodiment 2 is adopted for replacing the EL ray in embodiment 1. A plurality of groups of LED travelling lantern cables are arranged; each group of LED travelling lantern cables comprises a first LED lamp 581, a second LED lamp 582 and a third LED lamp 583.

In the master circuit board 40 of embodiment 2, the DC control circuit board 44 of the LED travelling lantern has a second DC positive output terminal 444 and three second DC negative input terminals 446. Positive electrodes of DC input terminals of a group of three LED lamps 581, 582 and 583 are respectively connected with the second DC positive output terminal 444 of the DC control circuit board 44 of the LED travelling lantern; and negative electrodes of the DC input terminals of the group of three LED lamps 581, 582 and 583 are respectively in one-to-one corresponding connection with the three second DC negative input terminals 446 of the DC control circuit board 44 of the LED travelling lantern. When the DC control circuit board 44 of the LED travelling lantern successively conducts the three second DC negative input terminals 446 according to pulse instructions of the master control circuit microprocessor 41 and program instructions preset by the control IC chip 447 of the LED lamps, the group of three LED lamps 581, 582 and 583 are successively conducted to emit light. The conducting frequency is the same as that in embodiment 1, and a point-by-point progressive light emitting frequency is 30-300 milliseconds.

Embodiment 3

Figure 4:
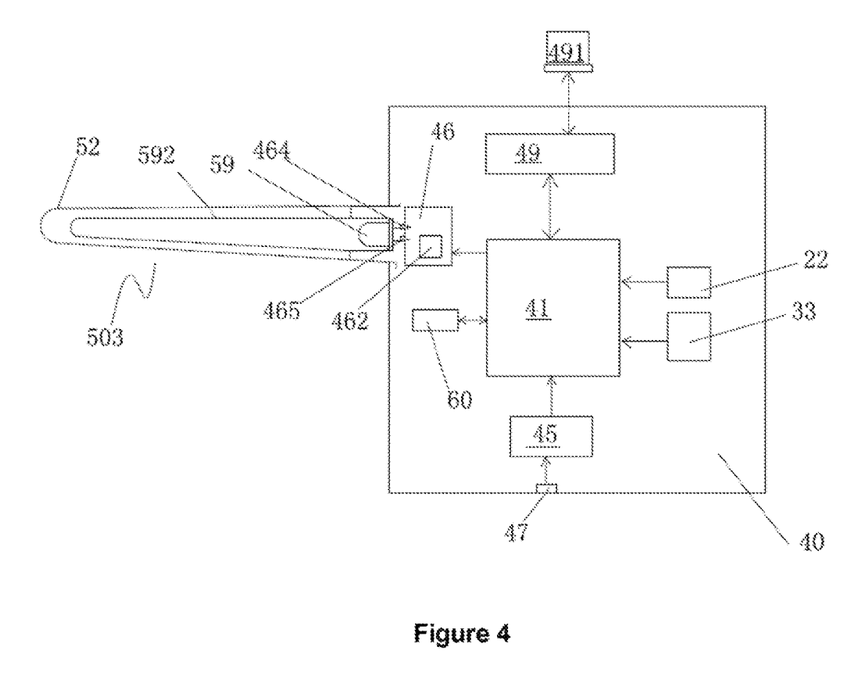
FIG. 4 is a structural schematic diagram of embodiment 3.

With reference to FIG. 1 and FIG. 4, the technical solution of embodiment 3 and the technical solution of embodiment 1 are almost the same and have the difference that: the third visual signal current mouse tail 503 of embodiment 3 replaces the first visual signal current mouse tail 501 of embodiment 1. The third visual signal current mouse tail 503 replaces the EL ray of embodiment 1 with a single focusing projection lamp 59, and a light guiding column 592 or light guiding pipe is sleeved outside the focusing projection lamp 59. In the master circuit board 40, the control circuit board 46 of the focusing projection lamp is adopted for replacing the multipath AC driving circuit board 43 of the EL ray in embodiment 1. The control IC chip 462 of the focusing projection lamp is adopted for replacing the control IC chip 432 of the EL ray in embodiment 1.

Specifically, in the third visual signal current mouse tail 503, a focusing projection lamp 59, and a light guiding column 592 thereof are arranged in a bar-shaped pipe cavity formed by the light-transparent nonconducting coating layer 52. Preferably, the focusing projection lamp 59 is an LED focusing projection lamp. The control circuit board 46 of the focusing projection lamp is provided with a third DC positive output terminal 464 and a third DC negative input terminal 465. The focusing projection lamp 59 is connected with the control circuit board 46 of the focusing projection lamp through the third DC positive output terminal 464 and the third DC negative input terminal 465 so as to achieve that the control circuit board 46 of the focusing projection lamp controls the focusing projection lamp 59. The focusing projection lamp 59 displays the change state of signal emission of the wireless tailed mouse through the change of light emitting brightness, colors and flashing frequency, wherein the light guiding column 592 can be replaced with the light guiding pipe.

Embodiment 4

Figure 6:
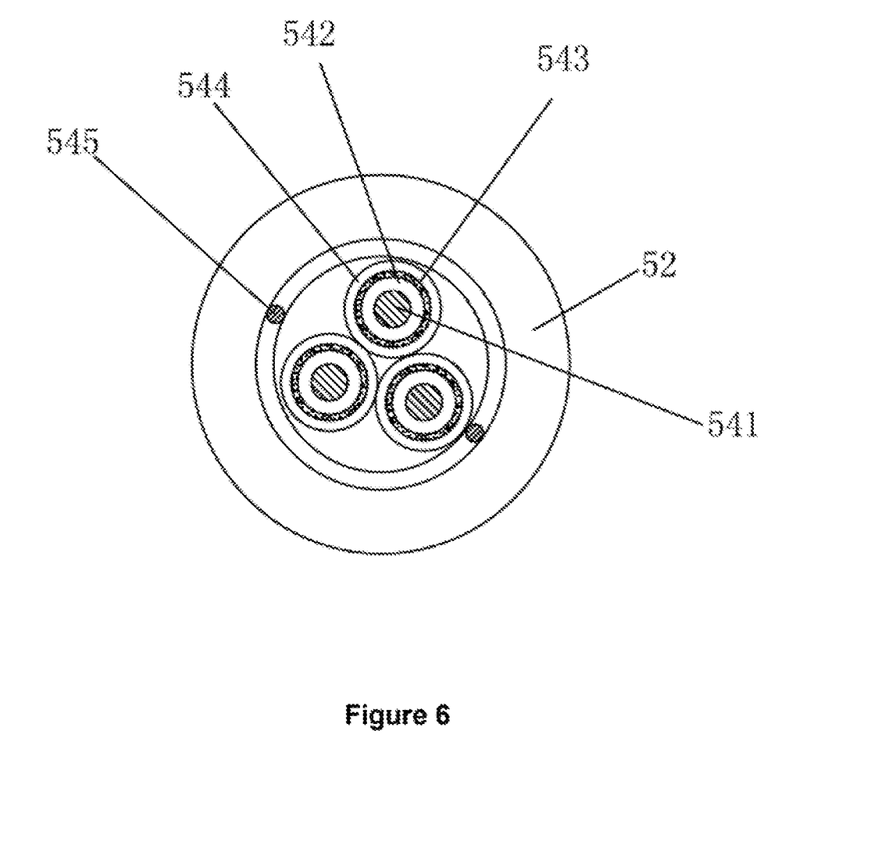
FIG. 6 is a second radial section view of a visual signal current mouse tail.

The technical solution of embodiment 4 and the technical solution of embodiment 1 are almost the same and have the difference that: the visual signal current mouse tail of embodiment 4 replaces the first visual signal current mouse tail 501 of embodiment 1. The visual signal mouse tail of embodiment 4 replaces the single ray of embodiment 1 with at least three EL rays. As shown in FIG. 6, each EL ray 54 comprises a central electrode conducting wire 541, and an insulated dielectric layer 542, a light emitting powder layer 543 and a light-transparent conducting layer 544 which are successively wrapped outside the central electrode conducting wire 541 from inside to outside. A plurality of auxiliary electrode wires 545 are respectively twisted on the outer wall formed by the light-transparent conducting layer 544 of each EL ray 54; and finally, the inner light-transparent nonconducting coating layer 546 is wrapped on the outer layer of each EL ray. After three EL rays 54 are mutually spirally twisted, each auxiliary electrode wire 545 is combined and twisted into one strand which is then connected to the AC output terminal 435 of the common auxiliary electrode, wherein it can be seen from embodiment 1, embodiment 2, embodiment 3 and embodiment 4 that the successive section-by-section light emitting cables, the LED travelling lanterns, the focusing projection lamps and the EL rays are all light emitting elements of the art. The visual signal current mouse tail only needs to install the light emitting elements therein, and the light emitting elements are controlled by the control circuit board of the light emitting elements of the master circuit board 40. The control circuit board of the light emitting elements refers to the multipath AC driving circuit board 43 of the EL ray in embodiment 1, the DC control circuit board 44 of the LED travelling lantern in embodiment 2, the DC control circuit board 46 of the focusing projection lamp in embodiment 3 and the multipath AC control circuit board of the EL ray in embodiment 4. The pulse signal instructions emitted by the wireless mouse transmitting modular component 49, the mouse button switch 22, the encoder 33 and the mouse displacement detector 60 are used for controlling the control circuit boards 43 and 44 of the light emitting elements by the master control circuit microprocessor 41 so as to control the mouse tails 501, 502 and 503 of the wireless mouse to display the emission states of different signals, wherein the light-transparent nonconducting coating layer 52 of the visual signal current mouse tail of the present invention presents plastic flexibility, and can be folded and processed into arc-shaped, semicircular and wavy transmitting antenna shapes. Preferably, the light-transparent nonconducting coating layer 52 is a light-transparent plastic layer. Further, the light-transparent nonconducting coating layer 52 is a transparent plastic layer or light guiding plastic layer.

The Micro USB mother base is a portable edition of the USB 2.0 standard and is smaller than a Mini USB interface. The Micro USB mother base is a next generation of specification of Mini-USB, and is developed and finished by a USB standardization organization, i.e., American USB Implementers Forum (USB-IF), on Jan. 4, 2007. The Micro USB mother base supports OTG, and is of 5 pin type like Mini-USB. Those skilled in the art know that the LED travelling lantern can comprise at least three LED lamps. LED is an abbreviation of light emitting diode in English and is translated into a light emitting diode. The basic structure of the light emitting diode is a chip of electroluminescent semiconductor material. In the control IC chip, IC is an abbreviation of an integrated circuit and is translated into the integrated circuit. The control IC chip is a micro electronic device or component. By adopting a certain technology, such elements as a transistor, a resistor, a capacitor, an inductor, etc. required in a circuit are interconnected with wires together, manufactured on one or a plurality of small pieces of semiconductor wafers or medium substrates, and then encapsulated in a pipe shell to become a micro structure having required circuit functions, wherein all the elements structurally form a whole.

The present invention is not limited to the above embodiments. With respect to the light emitting elements of the present invention, other light emitting elements can also be adopted and arranged in the visual signal current mouse tail of the wireless tailed mouse. The present invention is intended to include the modifications and the variations if the modifications and the variations belong to claims of the present invention and the equivalent technical scope on the premise that the various modifications or the variations made to the present invention do not depart from the spirit and the scope of the present invention.

We claim:

1. A wireless tailed mouse, characterized by comprising:
a mouse housing;
a master circuit board arranged in the mouse housing;
a visual signal current mouse tail externally connected to the mouse housing; and
a wireless signal receiver inserted into a computer;
wherein the visual signal current mouse tail comprises at least one light emitting element;
the master circuit board comprises a master control circuit microprocessor, a control circuit board of the light emitting element, a wireless signal transmitting modular component, a mouse displacement detector, a mouse button switch and an encoder of a roller;
the mouse displacement detector, the mouse button switch and the encoder are respectively connected with the master control circuit microprocessor; the master control circuit microprocessor is connected with the at least one light emitting element through the control circuit board of the light emitting element; and the master control circuit microprocessor is connected with the wireless signal receiver through the wireless signal transmitting modular component;
wherein the light emitting element is an LED travelling lantern; and
the control circuit board of the light emitting element is a DC control circuit board of the LED travelling lantern.

2. The wireless tailed mouse according to claim 1, wherein a plurality of groups of LED travelling lanterns are arranged; each group of LED travelling lanterns comprises at least three LED lamps; and the DC control circuit board of the LED travelling lantern has a point-by-point progressive light emitting frequency of 30-300 milliseconds.

3. The wireless tailed mouse according to claim 1, wherein the light emitting element is an LED focusing projection lamp; and the control circuit board of the light emitting element is a control circuit board of the focusing projection lamp.

4. The wireless tailed mouse according to claim 1, wherein the mouse tail is made of light-transparent flexible material which wraps a light emitting element and a signal transmitting antenna.

5. The wireless tailed mouse according to claim 4, wherein the mouse tail is bent and extended in an arc shape from the mouse housing to a front upper part.

6. The wireless tailed mouse according to claim 1, wherein the radial section of the mouse tail is circular or oval; and the area of the radial section of the mouse tail from a part connected with the mouse housing to an end part of the mouse tail is gradually decreased.

7. The wireless tailed mouse according to claim 6, wherein the master circuit board also comprises a lithium battery charging/discharging circuit board and a Micro USB mother base; and the Micro USB mother base is embedded to the mouse housing and is connected with the lithium battery charging/discharging circuit board.

8. A wireless tailed mouse, characterized by comprising:
a mouse housing;
a master circuit board arranged in the mouse housing;
a visual signal current mouse tail externally connected to the mouse housing; and
a wireless signal receiver inserted into a computer;
wherein the visual signal current mouse tail comprises at least one light emitting element;
the master circuit board comprises a master control circuit microprocessor, a control circuit board of the light emitting element, a wireless signal transmitting modular component, a mouse displacement detector, a mouse button switch and an encoder of a roller;
the mouse displacement detector, the mouse button switch and the encoder are respectively connected with the master control circuit microprocessor; the master control circuit microprocessor is connected with the at least one light emitting element through the control circuit board of the light emitting element; and the master control circuit microprocessor is connected with the wireless signal receiver through the wireless signal transmitting modular component;
wherein the light emitting element is an EL ray which emits light progressively point by point in accordance with a certain frequency; and the control circuit board of the light emitting element is a multipath AC driving circuit board for point-by-point progressive EL rays.

9. The wireless tailed mouse according to claim 8, wherein the EL ray comprises at least one EL ray with a point-by-point progressive light emitting frequency of 30-300 milliseconds.

* * * * *